United States Patent [19]

Beis

[11] Patent Number: 5,172,220
[45] Date of Patent: Dec. 15, 1992

[54] DAY-NIGHT BLACK AND WHITE AND COLOR VIDEO CAMERA

[75] Inventor: Uwe Beis, Garbsen, Fed. Rep. of Germany

[73] Assignee: Geutebrück Videotechnik GmbH, Bad Honnef, Fed. Rep. of Germany

[21] Appl. No.: 645,544

[22] Filed: Jan. 24, 1991

[51] Int. Cl.$^5$ .............................................. H04N 9/07
[52] U.S. Cl. ........................................ 358/44; 358/43
[58] Field of Search ................ 358/41, 43, 44, 48, 358/50, 55, 213.23, 221, 228

[56] References Cited

U.S. PATENT DOCUMENTS

| | | |
|---|---|---|
| 3,891,795 | 6/1975 | Johnson et al. . |
| 4,016,597 | 4/1977 | Dillon et al. . |
| 4,437,111 | 3/1984 | Inai et al. ............................ 358/44 |
| 4,658,287 | 4/1987 | Chen .................................. 358/44 |
| 4,677,489 | 6/1987 | Nishimura et al. . |
| 4,717,952 | 1/1988 | Kohayakawa et al. ............. 358/44 |
| 4,823,186 | 4/1989 | Muramatsu ........................ 358/43 |
| 5,040,068 | 8/1991 | Parulski et al. .................... 358/909 |

Primary Examiner—Edward L. Coles, Sr.
Assistant Examiner—Kim Yen Vu
Attorney, Agent, or Firm—Peter K. Kontler

[57] ABSTRACT

An optical monitoring system has a video camera which includes a first sensing unit for the production of black-and-white images and a second sensing unit for the production of color images. The first sensing unit generates black-and-white image signals which are sent to a processor for black-and-white signals. Similarly, the second sensing unit generates color image signals which are sent to a processor for color signals. The processed signals leave the camera via a common output.

7 Claims, 4 Drawing Sheets

DAY-NIGHT BLACK AND WHITE AND COLOR VIDEO CAMERA

BACKGROUND OF THE INVENTION

The invention relates generally to a monitoring system.

More particularly, the invention relates to an optical monitoring system having a day-night black and white and color video camera.

For the surveillance of objects, e.g., structures and apparatus located inside structures or distributed over large areas, it is known to use video cameras which continuously produce images on monitors. In addition to black-and-white video cameras, it is attempted to employ color cameras for monitoring systems because of the greater amount of information available therefrom. It is known, however, that black-and-white cameras require much lower light intensities than color cameras. In other words, color video cameras are considerably less sensitive to light than black-and-white cameras.

Accordingly, difficulties arise when monitoring with a color video camera during the night hours. At night, a color video camera must be furnished with light of much greater intensity than that required for a black-and-white camera. Due to the greater illumination intensities, energy costs are significantly increased. To save energy, it is known to use separate light sources and cameras for large objects being monitored. Here, only the light sources for the particular camera in operation are switched on. Thus, continuous illumination of all portions of an object being monitored is avoided and only limited areas are illuminated at any time.

It is also known to activate light sources only when needed in response to alarm signals. However, it is desirable to produce images of objects being monitored without interruption.

SUMMARY OF THE INVENTION

It is an object of the invention to provide a video camera which makes it possible to combine the advantages of the relatively low light intensity requirements of black-and-white cameras with the information content of color images.

An additional object of the invention is to provide a video camera which makes it possible to produce color images within a first range of light intensities and black-and-white images within a lower, second range of light intensities.

A further object of the invention is to provide an optical monitoring system which enables the advantages of the relatively low light intensity requirements of black-and-white cameras to be combined with the information content of color images.

Another object of the invention is to provide an optical monitoring system which enables color images to be produced within a first range of light intensities and black-and-white images within a second, lower range of light intensities.

One more object of the invention is to provide an optical monitoring method which makes it possible to adjust to changing light conditions.

The preceding objects, as well as others which will become apparent as the description proceeds, are achieved by the invention.

One aspect of the invention resides in a video camera, particularly for an optical monitoring system. The camera comprises first image sensing means for the production of black-and-white images, and the first image sensing means includes means for generating black-and-white image signals. The camera further comprises second image sensing means for the production of color images, and the second image sensing means includes means for generating color image signals. First signal processing means is operatively associated with the first image sensing means to process the black-and-white signals whereas second signal processing means is operatively associated with the second image sensing means to process the color signals.

According to one embodiment of the invention, the camera additionally comprises means for activating and deactivating the respective image sensing means in dependence upon the intensity of the impinging light. The activating-and-deactivating means activates one of the sensing means and deactivates the other of the sensing means when the intensity of the incoming light is within a first range. On the other hand, when the intensity of the incoming light is within a different second range, the activating-and-deactivating means activates the previously inactive sensing means and deactivates the previously active sensing means. The second or color image sensing means is here placed in operation when sufficient light is available and is put out of operation when the amount of light is too small. There is then a changeover from the color image sensing means to the first or black-and-white image sensing means.

Switching from one image sensing means to the other can be accomplished by means of a light sensitive switch, e.g., a twilight switch, which is activated when the intensity of the incoming light reaches a threshold value. Alternatively, the magnitudes of the electrical output signals or image signals can be used.

The switch from one image sensing means to the other can occur abruptly upon reaching the threshold value. To this end, the activating-and-deactivating means can include a pivotable reflector or prism which changes the light path so that the color image sensing means and black-and-white image sensing means are alternately switched into the light path. For example, the activating-and-deactivating means may comprise a reflector which is pivotable between a first position in which the incoming light is reflected to one of the sensing means and a second position in which the incoming light is reflected to the other of the sensing means.

According to another embodiment of the invention, the camera additionally comprises a beam splitting arrangement which is designed so that both the color image sensing means and the black-and-white image sensing means are continuously exposed to the incoming light. The beam splitting arrangement includes a beam splitter and can also include one or more reflectors. The beam splitter conducts a first portion of the incoming light towards one of the sensing means and reflects a second portion of the incoming light towards the other sensing means. Here, a changeover from the color image sensing means to the black-and-white image sensing means, and vice versa, occurs progressively. The output signal of the color image sensing means decreases gradually with decreasing light intensity so that the output signal of the black-and-white image sensing means gradually predominates over that of the color image sensing means. Eventually, only a black-and-white image remains. The reverse takes place as the light intensity increases.

In accordance with a further embodiment of the invention, the black-and-white image sensing means comprises a plurality of electronic sensing elements for the production of black-and-white images while the color image sensing means comprises a plurality of electronic sensing elements for the production of color images. The black-and-white image sensing elements and the color image sensing elements constitute part of a single sensor having a first output for black-and-white image signals and a separate second output for color image signals. To increase the sensitivity to light, the number of black-and-white image sensing elements can be greater than the number of color image sensing elements and/or the sizes of the black-and-white image sensing elements can exceed the sizes of the color image sensing elements. Although this reduces the sensitivity of the color image sensing means to light, the sensitivity is still adequate for the recording of images during the day. On the other hand, image quality during the night using the black-and-white image sensing means is improved. The total number of image sensing elements can be greater than the number of image sensing elements in a conventional color video camera or a conventional black-and-white camera. The transition from color reproduction to black-and-white reproduction is progressive. This embodiment has the advantage that the color and black-and-white images are necessarily coincident as the transition from the color image sensing means to the black-and-white image sensing means, and vice versa, takes place. Accordingly, no additional means are required to adjust for coincidence.

The novel features which are considered as characteristic of the invention are set forth in particular in the appended claims. The improved optical monitoring system and video camera, however, both as to construction and mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
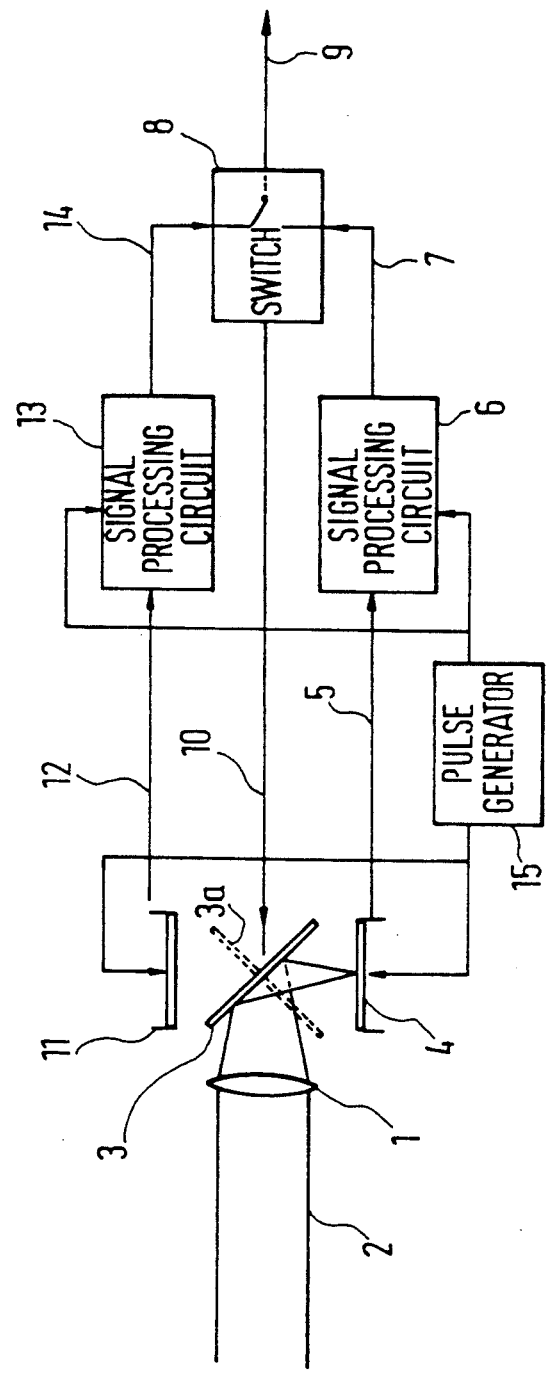
FIG. 1 is a block diagram of one embodiment of an optical monitoring system having a video camera in accordance with the invention.

FIG. 1 shows a video camera in accordance with the invention. An incoming light beam 2 from an object being monitored is projected onto a reflector 3 by an optical lens system or objective 1. The reflector 3 is pivotable through 90 degrees between the position illustrated in full lines and the position illustrated in broken lines and identified by 3a. In the full line position, the reflector 3 projects the light beam 2 onto a sensor or recorder 4 for the production of black-and-white images. The black-and-white image sensor 4 has means for generating output signals which represent black-and-white images and these image signals are sent, via a conductor 5, to a conventional signal processor 6 designed to process black-and-white image signals. A conductor 7 transmits the processed black-and-white image signals to an image selection and reflector control switch 8 which operates in dependence upon signal magnitude, i.e., in dependence upon the intensity of the light beam 2. The processed black-and-white image signals leave the switch 8 and the camera by means of an output or conductor 9 and are converted to a black-and-white image.

The switch 8 is connected, via a junction line 10, to a non-illustrated adjusting mechanism, e.g., an electromagnet, for the reflector 3. When the intensity of the light beam 2 exceeds a threshold value, the switch 8 causes the reflector 3 to be pivoted from the full line position to the broken line position 3a. The light beam 2 is then reflected to a sensor or recorder 11 for the production of color images. The color image sensor 11 has means for generating output signals which represent color images and these image signals are sent, via a conductor 12, to a conventional signal processor 13 designed to process color image signals. A conductor 14 transmits the processed color image signals to the switch 8. As before, the processed color image signals leave the switch 8 and the camera by means of the output 9 and are converted to a color image.

A deflection signal or pulse generator 15 is associated with the image sensors 4, 11 and signal processors 6, 13 of the camera and provides for synchronization between the image sensors 4, 11 and the respective signal processors 6, 13. The generator 15 has a function corresponding to that in conventional black-and-white or color cameras. In tube cameras, a generator of this type provides line-by-line guidance or deflection of the electron beam used to scan the light-sensitive layer. On the other hand, in semiconductor image recorders, such a generator insures that the charge which is stored in the image sensing elements and represents the intensity at the respective location appears at the output of the image recorder at the proper time.

The camera of FIG. 1 comprises two separate image sensors, namely, the black-and-white image sensor 4 and the color image sensor 11. Only one of the image sensors 4, 11 is disposed in the light path at any time and the sensor 4 or 11 which is located in the light path depends upon the intensity of the light entering the camera. The color image sensor 11 is disposed in the light path when the intensity exceeds a threshold value whereas the black-and-white sensor 4 is disposed in the light path when the intensity is below the threshold value.

Figure 2:
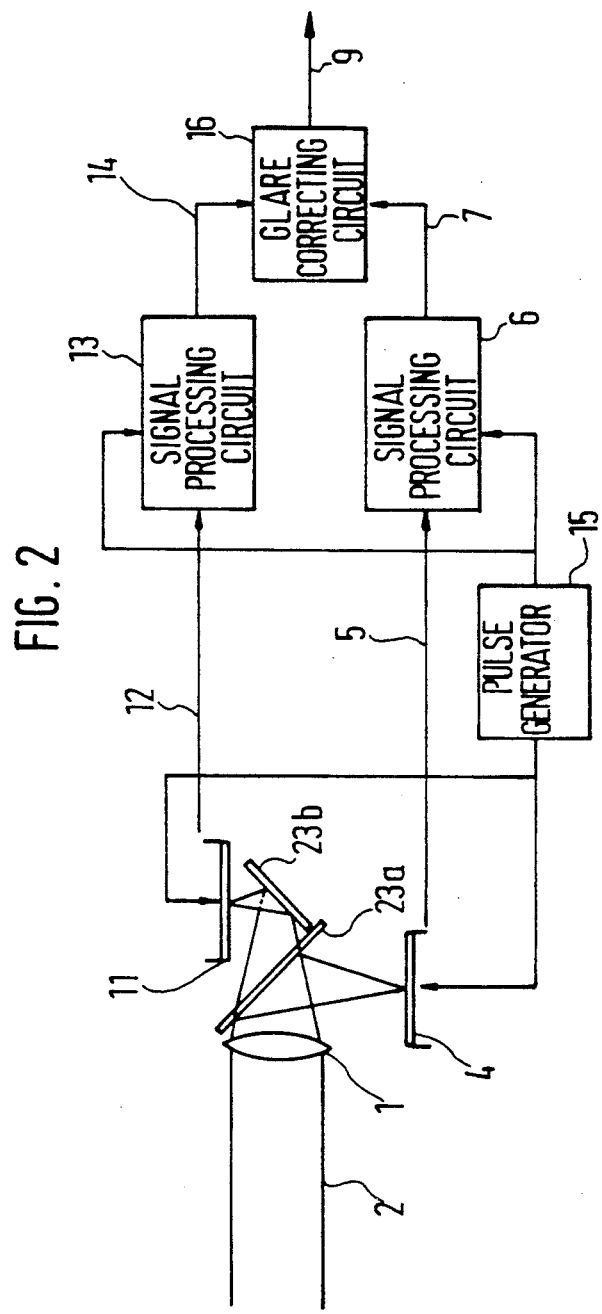
FIG. 2 is a block diagram of another embodiment of an optical monitoring system having a video camera according to the invention.

The camera of FIG. 2, which allows simplification to be achieved, likewise has a black-and-white image sensor or recorder 4 and a separate color image sensor or recorder 11. Here, however, both of the image sensors 4, 11 continuously receive a portion of the incoming light from the object being monitored with the black-and-white image sensor 4 advantageously receiving a greater portion than the color image sensor 11. In FIG. 2, the same reference numerals as in FIG. 1 are used to identify like elements.

The pivotable reflector 3 of FIG. 1 is replaced by a beam splitting system in FIG. 2. The beam splitting system includes a beam splitter 23a as well as a reflector 23b which is located behind the beam splitter 23a as considered in the direction of propagation of the incoming light beam 2. The beam splitter 23a reflects a portion of the light beam 2 to the black-and-white image sensor 4. The remainder of the light beam 2 is conducted through the beam splitter 23a to the reflector 23b which reflects the impinging light to the color image sensor 11. Accordingly, the back-and-white image sensor 4 and the color image sensor 11 simultaneously and continuously receive respective portions of the light beam 2 coming from the object being monitored. Both image sensors 4, 11 continuously and simultaneously generate image signals which are sent to the respective signal processors 6, 13. From the signal processors 6, 13, the processed black-and-white image signals and processed color image signals are conducted into a circuit 16 which operates in dependence upon signal magnitude and functions to eliminate image glare. The processed black-and-white image signals and processed color image signals leave the circuit 16 and the camera via the output 9 and are converted into black-and-white and color images.

The camera of FIG. 2 lacks a connection between the circuit 16 and the beam splitting system 23a, 23b. The beam splitting system 23a, 23b can be replaced by a prism.

Figure 3:
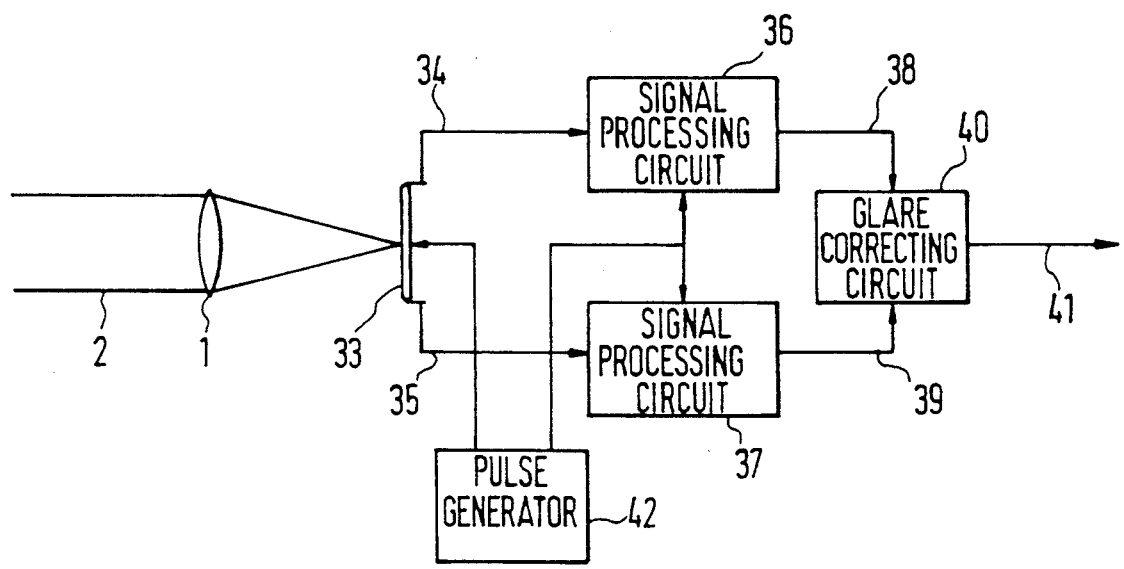
FIG. 3 is a block diagram of an additional embodiment of an optical monitoring system having a video camera in accordance with the invention.

Another camera which allows simplification to be achieved is shown in FIG. 3. Here, a single image sensor or recorder 33 is provided for both black-and-white images and color images. The image sensor 33 has one set of image sensing elements or cells for the production of black-and-white images and another, separate set of image sensing elements or cells for the production of color images. The black-and-white image sensing elements include means for generating output signals which represent black-and-white images and the image sensor 33 is provided with an output or terminal 35 for these image signals. Similarly, the color image sensing elements include means for generating output signals which represent color images and the image sensor 33 has a separate output or terminal 34 for such color image signals.

Advantageously, the number of black-and-white image sensing elements exceeds the number of color image sensing elements and/or the sizes of the black-and-white image sensing element exceed those of the color image sensing elements.

The black-and-white image signals issuing from the image sensor 33 are sent to a conventional signal processor 37 designed to process black-and-white image signals. A conductor 39 transmits the processed black-and-white image signals to a switching module 40 which operates in dependence upon signal magnitude and functions to eliminate image glare. The processed black-and-white image signals leave the switching module 40 and the camera via an output or conductor 41 and are converted to a black-and-white image.

Analogously, the color image signals issuing from the image sensor 33 are sent to a conventional signal processor 36 designed to process color image signals. A conductor 38 then forwards the processed color image signals to the switching module 40. From the switching module 40, the processed color image signals leave the camera by way of the output 41 and are converted to a color image.

A deflection signal or pulse generator 42 is connected to the image sensor 33 and the signal processors 36, 37 by means of conductors and has the same function as the generator 15 of FIGS. 1 and 2.

The pulses generated can cause the charge which is built up in the black-and-white image sensing means at high illumination intensities to be depleted much more rapidly than during normal retrieval. This makes it possible to prevent override by the black-and-white image sensing means and allows for sensitivity adjustment of the color image sensing means and the black-and-white image sensing means.

A virtual shorter exposure time is achieved here. This technique is also referred to as "electronic shutter".

Figure 4:
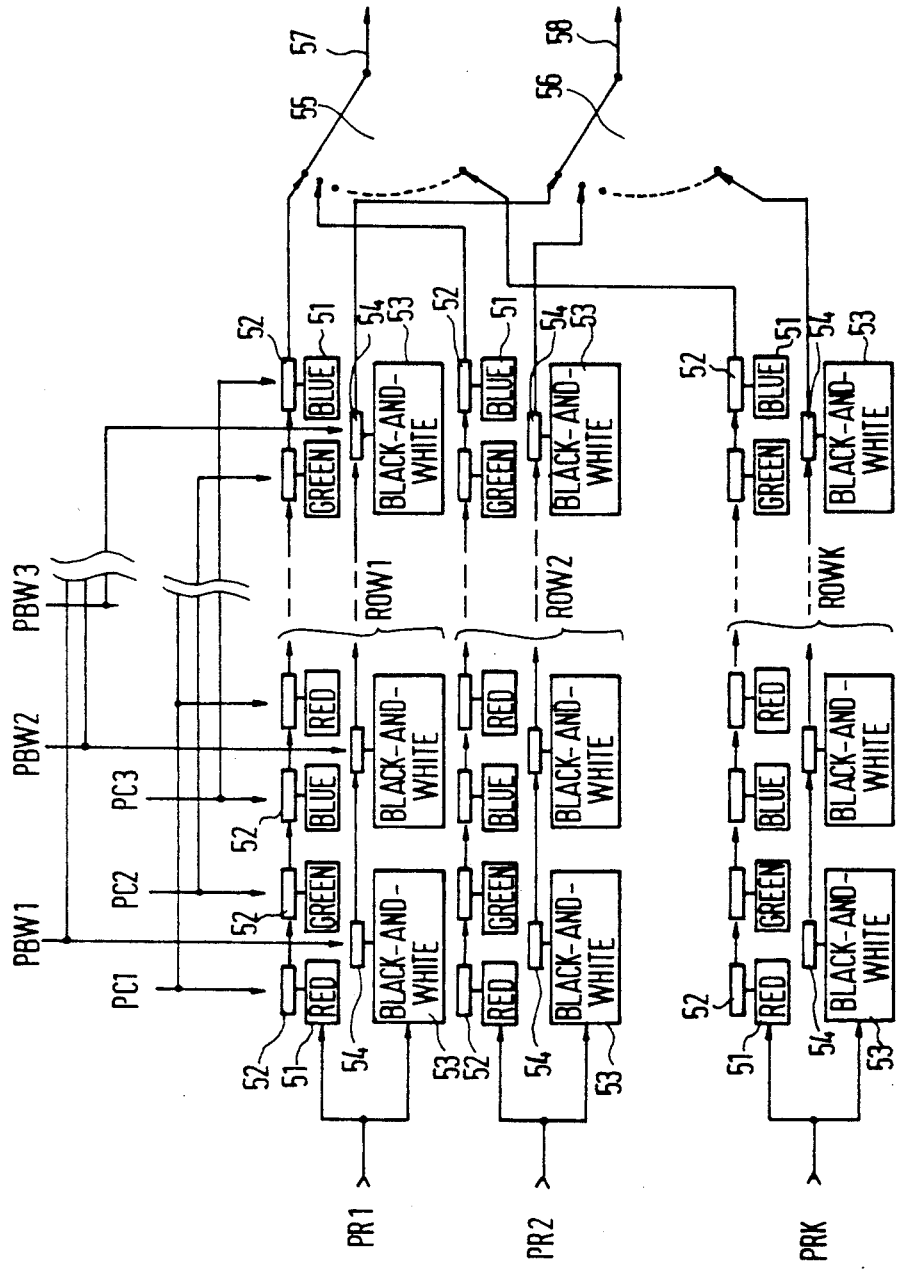
FIG. 4 is a circuit diagram illustrating one arrangement for the image sensing elements in an optical monitoring system and video camera according to the invention.

FIG. 4 is a simplified circuit diagram illustrating one arrangement for the light-sensitive image sensing elements or cells in a combined black-and-white and color camera according to the invention. The arrangement of FIG. 4 is assumed to employ CCD (charge-coupled device) technology. Furthermore, although the design shown in FIG. 4 is that for a "line-transfer" sensor, the principle of the invention can be applied to other conventional techniques such as the "frame-transfer" and "MOS" techniques.

The arrangement of FIG. 4 is made up of rows and columns of color sensing cells 51 and black-and-white sensing cells 53 with the number of rows being k. To clarify the electrical and functional separation of the color image sensing means and the black-and-white image sensing means, the number of columns, n, for the color sensing cells 51 has been chosen to be different from the number of columns, m, for the black-and-white sensing cells 53. Each row thus contains a color sensing cells 51 and m black-and-white sensing cells 53. As indicated by the legends, each of the color sensing cells 51 is provided with a red, green or blue filter as is necessary for the production of color images. The infrared filter required for color exposures has not been illustrated and, during daytime operation, for example, can be moved into the light path by means of a simple mechanism. Alternatively, the infrared filter can be fixedly mounted on the color sensing cells 51 if technologically feasible.

The black-and-white sensing cells 53 are not provided with color filters. The black-and-white sensing cells 53 constitute a larger fraction of the light-collecting area of the camera than the color sensing cells 51. Hence, the black-and-white sensing cells 53 are only slightly less sensitive than the sensing cells of an ordinary black-and-white camera.

The operating principle of a line-transfer, CCD camera such as that of FIG. 4 is as follows:

Upon exposure of the color sensing cells 51 and the black-and-white sensing cells 53, charges are built up in the sensing cells 51, 53. To generate an image, these charges are transferred to charge transport cells at regular intervals, i.e., once per image. Transfer of the charges is accomplished by means of clocking pulses PR1, PR2 . . . PRk applied to the respective rows 1,2 . . . k of sensing cells 51, 53. The charges developed in the color sensing cells 51 are transferred to charge transport cells 52 while the charges developed in the black-and-white sensing cells 53 are transferred to charge transport cells 54. Each of the charge transport cells 52 is associated with a respective color sensing cell 51 while each of the charge transport cells 54 is associated with a respective black-and-white sensing cell 53. Accordingly, the charge transport cells 52 may be considered to constitute part of the rows and columns defined by the color sensing cells 51 whereas the charge transport cells 52 may be considered to form part of the rows and columns defined by the black-and-white sensing cells 53. Following charge transfer, clocking pulses PC1, PC2, PC3 are applied to the columns made up of the color cells 51, 52 thereby shifting the charges in the charge transport cells 52 to a row selector switch 55 having an output 57. In this manner, signals suitable for conversion into a color image are generated at the output 57.

Similarly, clocking pulses PBW1, PBW2, PBW3 are applied to the columns made up of the black-and-white cells 53, 54 thus causing the charges in the charge transport cells 54 to be shifted to a row selector switch 56 having an output 58. Signals suitable for conversion to a black-and-white image are then produced at the output 58.

In FIG. 4, the number of columns, n, defined by the color cells 51, 52 is greater than the number of columns, m, defined by the black-and-white cells 53, 54 with m=/2. However, it is also possible for the number of columns formed by the color cells 51, 52 to equal the number of columns formed by the black-and-white cells 53, 54. In such a case, the clocking pulses PC1, PC2, PC3 for the columns of color cells 51, 52 may be combined with the clocking pulses PBW1, PBW2, PBW3 for the columns of black-and-white cells 53, 54.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A combined black-and-white and color video camera for surveillance purposes, comprising first image sensing means for the production of black-and-white images, said first image sensing means including means for generating black-and-white signals; second image sensing means for the production of color images, said second image sensing means including means for generating color signals, said first sensing means comprising a plurality of first sensing elements and said second sensing means comprising a plurality of second sensing elements, said first and second sensing elements constituting part of a single image sensor and said sensor having a first output for said black-and-white signals and a second output for said color signals; first signal processing means operatively associated with said sensor to process said black-and-white signals; second signal processing means operatively associated with said sensor to process said color signals; and means for activating one of said sensing means and deactivating the other of said sensing means when the intensity of incoming light is within a first range, and activating said other sensing means and deactivating said one sensing means when the intensity of the incoming light is within a different second range.

2. The video camera of claim 1, wherein said activating-and-deactivating means comprises a reflector which is pivotable between a first position in which the incoming light in reflected to said one sensing means and a second position in which the incoming light is reflected to said other sensing means.

3. The video camera of claim 1, further comprising a beam splitter which conducts a first portion of the incoming light towards one of said sensing means and reflects a second portion of the incoming light towards the other of said sensing means.

4. The video camera of claim 1, further comprising a device responsive to signal magnitude, said device having one input which is operatively associated with said first signal processing means, another input which is operatively associated with said second signal processing means, and a single output for both black-and-white and color signals.

5. The camera of claim 1, wherein said activating-and deactivating means comprises a device responsive to signal magnitude, said device having one input which is operatively associated with said first signal processing means, another input which is operatively associated with said second signal processing means, and a single output for black-and-white or color signals.

6. A video camera, particularly for an optical monitoring system, comprising first image sensing means for the production of black-and-white images, said first image sensing means including means for generating black-and-white signals and including a plurality of first sensing elements; second image sensing means for the production of color images, said second image sensing means including means for generating color signals and comprising a plurality of second sensing elements, said first and second sensing elements constituting part of a single image sensor and said sensor having a first output for said black-and-white signals and a second output for said color signals, the number of said first sensing elements exceeding the number of said second sensing elements or the sizes of said first sensing elements exceeding the sizes of said second sensing elements; first signal processing means operatively associated with said first image sensing means to process said black-and-white signals; and second signal processing means operatively associated with said second image sensing means to process said color signals.

7. A video camera, particularly for an optical monitoring system, comprising first image sensing means for the production of black-and-white images, said first image sensing means including means for generating black-and-white signals and including a plurality of first sensing elements; second image sensing means for the production of color images, said second image sensing means including means for generating color signals and comprising a plurality of second sensing elements, said first and second sensing elements constituting part of a single image sensor and said sensor having a first output for said black-and-white signals and a second output for said color signals, the number of said first sensing elements exceeding the number of said second sensing elements and the sizes of said first sensing elements exceeding the sizes of said second sensing elements; first signal processing means operatively associated with said first image sensing means to process said black-and-white signals; and second signal processing means operatively associated with said second image sensing means to process said color signals.

* * * * *